United States Patent Office 3,579,341
Patented May 18, 1971

3,579,341
PULPY TEXTURED FOOD SYSTEMS CONTAINING INHIBITED STARCHES
Paolo C. Trubiano, Somerville, and Nicholas G. Marotta, Green Brook, N.J., assignors to National Starch and Chemical Corporation, New York, N.Y.
No Drawing. Filed May 7, 1969, Ser. No. 822,722
Int. Cl. A23l 1/00, 1/10, 1/40
U.S. Cl. 99—83                              5 Claims

ABSTRACT OF THE DISCLOSURE

A method for the preparation of starch containing food products exhibiting a grainy, pulpy texture, as well as the food products thus prepared, said method comprising the step of admixing the non-starch ingredients of said food product with an amylose-containing starch product which has been inhibited by reaction with a crosslinking agent, then precooked, gelatinized, and pulverized to within a certain particle size range, and thereafter heating the resulting mixture at a temperature of at least about 160° F. so as to effect the swelling of the starch particles therein.

BACKGROUND OF THE INVENTION

The appearance and overall consumer appeal of many processed food products is greatly enhanced when they are characterized by the presence of a grainy, pulpy texture. Such food products thus appear to retain much of their natural texture and, in so doing, exhibit a rich, highly concentrated appearance as opposed to the thick, pasty character which often results from the use of conventional starch thickeners. In addition, the presence of a pulpy texture is often accompanied by other improved properties of color and taste.

Various attempts have been made to impart this desirable grainy, pulpy texture to starch containing food products. One such method has involved the incorporation of cracker meal. However, the result of the latter technique is merely to disperse white flecks of cracker particles within the system while failing to impart either a good grain or a pulpy appearance to the resulting food product. In addition, the presence of the cracker meal detracts from the natural color of the food product. Another method, which is primarily used in baby foods, involves the incorporation of tapioca pearls therein. In this case, the extreme clarity and fragility of the pearls severely hamper the formation of a desirable pulpy texture within the food product.

It is the prime object of this invention to provide starch containing food systems with a grainy, pulpy texture. It is a further object to provide the latter characteristics by the use of starch products which exhibit an appropriate particle size and which will, more particularly, produce particles that remain intact both during and after additional processing of the resulting food product. Various other objects and advantages of this invention will become apparent to the practitioner from the following detailed description thereof.

TECHNICAL DISCLOSURE OF THE INVENTION

In U.S. Pat. No. 3,443,964, assigned to the assignee of the subject application, and which discloses a method for preparing starch containing food products displaying a grainy, pulpy texture, it is required that the gelatinized, crosslinked amylose-containing starch products which are used therein be inhibited by reaction with a crosslinking agent to the extent that they exhibit a granule swelling power (GSP) in the range of from about 8 to 32. The granule swelling power will vary with the degree to which a starch has been crosslinked and is a measure of the extent of granule inhibition. At the time at which the latter disclosure was prepared, it was though that excessive inhibition, which would reduce the GSP value appreciably below 8, would result in starch products which were incapable of providing stable, pulpy textured food products since it was believed that the individual granules or particles derived from such starches would not swell sufficiently during subsequent processing operations.

We have now, however, discovered that certain starches which are treated so as to have a GSP of from about 3 to 8 can also be useful in imparting a grainy, pulpy texture to food products if such starches are precooked, under specified conditions, prior to their being pregelatinized by drum drying.

The starch products which may be used in the novel process of this invention comprise crosslinked, amylose-containing starches. The applicable starch bases which may be used in preparing these starch products may be derived from such plant sources as corn, potato, sweet potato, wheat, rice, sago, tapioca, sorghum, or the like, as well as the high amylose containing varieties of these sources. Also included are the conversion products derived from any of the latter bases including, for example, dextrines prepared by the hydrolytic action of acid and/or heat; oxidized starches prepared by treatment with oxidants such as sodium hypochlorite; and, fluidity or thin boiling starches prepared by enzyme conversion or by mild acid hydrolysis. In addition, the amylose fraction derived from any of the above noted starch bases may also be utilized. It is also possible to employ any substituted ether or ester derivative of these starch bases or of their amylose fractions.

In order to inhibit, i.e. to crosslink, any of the latter starch bases, it is ordinarily necessary to react the starch with a polyfunctional crosslinking agent. These include: aliphatic dihalides such as propylene dichloride, dichloropentane, ethylene dibromide, glycerol dichlorohydrin and dichlorobutane; ether forming epoxy halogen compounds such as epichlorohydrin and epibromohydrin; certain polyfunctional reagents such as cyanuric chloride, phosphorous oxychloride, metaphosphates and polymetaphosphates; aldehydes such as formaldehyde and formaldehyde containing resins and prepolymers; succinic anhydride; and, mixtures of adipic or citric acid with acetic anhydride. In general, these crosslinking agents may be defined as compounds containing at least two functional groups which can react with at least two available hydroxy groups of the starch molecule or molecules and thus alter the cooking characteristics of the resulting starch product.

With respect to the actual preparation of these inhibited starches, we refer to a number of U.S. patents relating to various inhibition processes. These include: U.S. 2,500,- 950, which covers the use of dihalides and epoxy halogen compounds; U.S. 2,805,220, which covers the use of cyanuric chloride; U.S. 2,801,242, which covers the use of mixtures of meta and polymetaphosphates; U.S. 2,461,- 139, which covers the use of succinic anhydride as well as mixtures of adipic or citric acid with acetic anhydride; and U.S. 2,328,537, which covers the use of phosphorous oxychloride.

Furthermore, with respect to the amount of crosslinking reagent needed for the reaction, this is determined by the granule swelling power (GSP) of the resulting crosslinked starch. As noted hereinabove, granule swelling power is a measure of the extent of granule inhibition; and this may be defined as the amount of swollen, hydrated paste which is formed by the cooking, in water under specific conditions, of one gram of dry starch as divided by the weight of anhydrous starch in the swollen paste.

The GSP is determined, in practice, by dispersing one gram of starch (anhydrous weight) in enough distilled water to give a total weight of 100 grams. Normally, the starch is suspended in this water, stirred over a boiling water bath for five minutes, and then covered for the remainder of the cooking cycle. After cooking is complete, the sample is readjusted to a weight of 100 grams and transferred, quantitatively, into graduated 100 ml. centrifuge cups. The sample is then centrifuged at 2000 r.p.m. for exactly 20 minutes and the starch dispersion is removed as a clear supernate and a compacted swollen paste. The percent solids in the supernate is determined by evaporation of an aliquot. The wet weight of the swollen paste is determined directly after the decantation of the supernate and the amount of dry solids in the paste is determined by evaporation. The granule swelling power is then calculated by the formula:

$$GSP = \frac{\text{Wet weight of swollen paste}}{\text{Weight of dry starch in swollen paste}}$$

Thus, in order to function effectively as texture producing starches according to the process of this invention, the selected starches should have a GSP value of from about 3 to 8. Therefore, the quantity of crosslinking reagent to be used in the inhibition process may be defined as that amount required to obtain a product having a GSP of between 3 and 8. As these reagents all differ in their reactivity with starch, the optimum proportions will be different for each reagent. The amount of reagent used will also vary depending upon the efficiency of the crosslinking reaction as affected by such variations as time, agitation, temperature and catalyst.

Prior to their being drum dried, i.e. prior to being pregelatinized by drum drying, it is necessary that these starches having a GSP value of from about 3 to 8 be precooked in water at a temperature of from about 250 to 350° F. for a period of from about 0.5 to 5 minutes in order to permit their successful use in the process of this invention. This precooking operation may be carried out by the use of an autoclave, a swept-surface heat exchanger, jet cooker or other means desired by the practitioner. When pressure cooking is utilized, the application of pressures of from about 15 to 100 p.s.i. have been found to be useful. The purpose of this precooking operation is, essentially, to permit the majority of the crosslinked starch granules to swell, and any technique which will accomplish the latter purpose may be utilized. At the same time, this precooking step will often effect the bursting of a minor proportion of the starch granules.

Although the above discussed patent describes the optional use of a precooking operation of the type required in the subject process, it must be emphasized that the process set forth in the latter disclosure is at all times, nonetheless, directed to the use of starches having a GSP which is at least about 8. Thus, it was, heretofore, believed that these extensively crosslinked starches having a GSP value of less than 8 could never be successfully employed for preparing grainy, pulpy textured food products. It was, therefore, surprising to find that the required application of the precooking step now made it possible to utilize these extensively crosslinked starches in the preparation of such food products.

The precooked, crosslinked starch must next be gelatinized by being subjected to a process which will further swell and thereupon ultimately burst the majority of the starch granules, thereby enabling the thus treated starch product to swell in water and eventually to produce discrete, bulky particles. It will be understood that the precooking step will produce some swelling of the branch granules. Such gelatinized starches are commonly referred to as cold water swelling or pregelatinized starch. The gelatinization process preferably used, for purposes of this invention, is drum drying. In the latter procedure, an aqueous slurry of the crosslinked, precooked amylose-containing starch is passed over heated rollers which raise the temperature of the slurry above the gelatinization point of the starch present therein while also evaporating the water therefrom so as to ultimately yield dry, solid particles of pregelatinized starch.

The drum drying conditions, e.g. temperature and drum speeds, under which the starch product is gelatinized and dried will, of course, vary according to the particular formulation, the degree of crosslinking therein, the degree and density of the desired granule swelling and the ultimate end-use application.

Other mechanical means of accomplishing the latter gelatinization step, e.g. spray drying, flash drying and extrusion, etc., may also be utilized if so desired by the practitioner. It should be noted, however, that the drum drying procedure is most economical and efficient for purposes of this invention.

The starch products resulting from the drum drying process are in the form of thin, solid sheets which are then pulverized in order to provide particles of which no more than about 25%, by weight, will be retained on a No. 12 U.S. Standard Sieve, while no more than about 60%, by weight, will pass through a No. 100 U.S. Standard Sieve. Thus, the use of starch products which contain more than about 25%, by weight, of +12 material, i.e. particles which will be retained on a No. 12 mesh screen, will result in the formation of undesirable thick, unnatural textures in the final food products as opposed to imparting the desirable optimum grain-like, pulpy texture. On the other hand, starch products which contain more than about 60%, by weight, of −100 material, i.e. particles which will pass through a No. 100 mesh screen, cannot provide the particles whose large size is the basis of the resulting pulpy textured effect.

The crosslinked, precooked, pregelatinized, amylose-containing starch products, after having been pulverized to within the above stated particle size range, should now exhibit the properties which are required in order to enable them to provide the grainy, pulpy texture desired in the food products resulting from the novel process of this invention. Thus, being gelatinized, they are able to provide sufficient cold water swelling ability to produce discrete bulky particles during atmospheric cooking. In addition, they exhibit a proper mesh size and are sufficiently inhibited to permit their individual particles to withstand the heat, acidity, and agitation that may be encountered in subsequent food processing procedures.

Among the food products which can profit from the presence of the crosslinked, pregelatinized starch products produced according to the above procedure are: soups, tomato sauce, meat sauces, gravies, baby foods, puddings, cereals, fruit sauces such as apple sauce, fruit drinks such as pineapple drink, dry powdered mixes which may be reconstituted with water into fruit drinks, soups, etc., confections such as textured orange gum drops, and grainy textured baked goods such as cookies, crackers, pastries, and cakes. Thus, in tomato sauce, for example, the presence of such starch products enables the resulting sauce to exhibit the rich, natural texture of the fresh, raw tomato.

In order to incorporate these starches into a food product, they may merely be put into the form of an aqueous slurry which should contain at least about 10% of water, as based on the total weight of components in the final food product. As an optional component, these slurries may also contain a conventional starch thickener, such as inhibited tapioca or a waxy maize starch, the resulting slurry, either with or without the conventional thickener, thereupon being added to the various non-starch, food base ingredients. It should be noted that when reference is made to "water" or "moisture" in the process of this invention, we contemplate the use of water either in its pure state or as the liquid vehicle of a fruit juice or milk, etc. Furthermore, when reference is made to the "non-starch" ingredients of our products, we contemplate such ingredients as fruits, meats, fish, seafood, vegetables, flours, cereals, spices, flavors, sweeteners, colorings, preservatives, etc.

In either instance, the resulting mixture is then heated at a temperature of at least about 160° F., thereby causing the crosslinked, pregelatinized starch product to swell and thus form the desired discrete bulky particles. In all cases, the starch containing food products resulting from the process of our invention will have a moisture content of at least about 5%, by weight.

As previously mentioned, the resulting swollen particles of the crosslinked, pregelatinized starch products are not adversely affected by any of the food processing, and particularly the sterilization techniques to which the food products containing the latter starches will subsequently be subjected when they are to be packaged in sealed containers such as tin cans or glass jars. Such sterilization techniques include stationary cooking and retorting, i.e. pressure cooking at a combination of temperatures and pressures in excess of about 212° F. and one atmosphere; the latter method being of particular significance in the food industry. In addition, food systems having pH levels below about 4.5 are frequently sterilized by being cooked at atmospheric pressure, at temperatures less than about 100° C. The latter procedure is ordinarily used in the sterilization of fruit containing food products.

The amount of grain introduced into any particular food product may be left to the discretion of the practitioner. Such preference will, of course, depend on the natural characteristics of the basic food constituent as well as on the nature of the food formulation being prepared. The amount of grain present in the resulting food product may be determined by initially controlling the addition level of the crosslinked, pregelatinized starch products as well as the average particle size of the latter starch products. Thus, for example, typical values for tomato sauces would include a concentration of from about 1 to 4%, by weight, of a crosslinked, precooked, pregelatinized starch of which about 95%, by weight, of the particles are capable of passing through a No. 12 U.S. Standard Sieve but about 80%, by weight, of which will be retained on a No. 100 U.S. Standard Sieve.

Needless to say, the desired grainy texture will not be adversely affected by the inclusion in the food products of this invention of such additives as sweetening, coloring and flavoring agents.

In the following examples, which further illustrate the embodiment of this invention, all parts given are by weight unless otherwise specified.

EXAMPLE I

This example illustrates the preparation of a food system typical of the products of this invention which, in this case, was a tomato sauce characterized by its permanent grainy, pulpy texture.

The following ingredients were utilized in the preparation of the tomato sauce formulation of this example.

| | Parts |
|---|---|
| Tomato paste | 177.0 |
| Corn starch crosslinked, according to the method set forth in U.S. Pat. 2,500,950, with 1.0%, by weight, of epichlorohydrin, so as to obtain a product having a GSP value of 3.0; which was then pressure cooked at 80 p.s.i. and 325° F. for a period of four minutes; the precooked product was thereupon pregelatinized by drum drying for a period of about 30 minutes at a drum temperature of 300° F., and pulverized so as to obtain a product containing 5%, by weight, of particles retained on a No. 12 mesh screen and 20%, by weight, of particles passing through a No. 100 mesh screen | 14.5 |
| Sugar | 14.5 |
| Water | 305.2 |

The above described starch product was dry blended with the sugar and then dispersed in 100 parts of water. Under agitation, the tomato paste was then added to the remaining amount of water so as to achieve a mixture having a uniform consistency. Both slurries were then admixed and the resulting blend was thereupon cooked for five minutes at a temperature of 190° F. The resulting hot sauce was then canned, at elevated temperatures, and the sealed cans retorted, i.e. pressure cooked, for 25 minutes at a temperature of 245° F. and a pressure of 15 p.s.i.

The resulting tomato sauce was found to exhibit an excellent, natural grainy, pulp-like texture as well as a natural red color. There was no evidence of particle deterioration as a result of the retort heating procedure. In addition, neither stirring nor agitation disrupted the conformation of the swollen particles.

In a repetition of the above described procedure there were utilized two additional samples of corn starches having a GSP of 7 and of 4.6 which had been obtained by treatment of raw corn starch with 0.05 and 1.0%, by weight, of epichlorohydrin, respectively, according to the procedure described in U.S. Pat. No. 2,500,950. The latter starch samples were then precooked, drum dried, and pulverized to the particle size range set forth hereinabove and subsequently used in the preparation of tomato sauces. Each of the resulting tomato sauces was found to exhibit a natural grainy, pulp-like texture as well as a natural red color.

EXAMPLE II

This example illustrates the necessity of precooking the inhibited starch used herein prior to its being drum dried in order to be able to obtain the desired grainy, pulpy texture in the final food product.

Thus, in several repetitions of the procedure used for the preparation of the tomato sauce described in Example I, four different crosslinked starches, two of which had been precooked and two of which had not been precooked prior to their being drum dried, were substituted for the particular starch originally utilized therein.

The starches employed were:

No. 1—A corn starch which had been crosslinked, according to the method set forth in U.S. Pat. No. 2,500,950, with 0.5%, by weight, of epichlorohydrin so as to obtain a product having a GSP value of 3.3 and which was thereupon drum dried without first being precooked after which it was pulverized to the particle size range set forth in Example I, hereinabove.

No. 2—A treated corn starch identical to No. 1, hereinabove, which in this case, however, was precooked by being pressure cooked for a period of four minutes at 80 p.s.i. and a temperature of 325° F. prior to being drum dried.

No. 3—A corn starch which had been crosslinked, according to the method set forth in U.S. Pat. No. 2,500,950 with 1.5%, by weight, of epichlorohydrin so as to obtain a product having a GSP value of 2.8 which was thereupon drum dried without first being precooked after which it was pulverized to the particle size range set forth in Example I, hereinabove.

No. 4—A treated corn starch identical to No. 3, hereinabove, which in this case, however, was precooked by being jet cooked for a period of about one minute at 80 p.s.i. and at a temperature of 325° F. prior to drum drying.

The tomato sauces which were produced when using precooked starches numbers 2 and 4 were characterized by their grainy, pulpy texture and were of excellent quality, fully comparable to the sauce described in Example I, hereinabove, with regard to the appearance and stability of their pulpy texture. However, the tomato sauces which were produced using starches numbers 1 and 3 which had not been precooked prior to drum drying displayed little or no graininess and their texture was characterized by low viscosity, a smooth appearance, and an opaque dull color.

EXAMPLE III

This example illustrates the preparation of additional food products of this invention characterized by their unique grainy, pulpy texture.

Apple sauce

The following ingredients were used in this formulation:

| | Parts |
|---|---|
| Apple juice | 100.0 |
| Lemon juice | 0.3 |
| High amylose corn starch crosslinked, according to the method set forth in U.S. Pat. 2,500,950, with 1.0%, by weight, of epichlorohydrin so as to obtain a product having a GSP value of 3.1; which was then pressure cooked at 80 p.s.i. and 325° F. for a period of four minutes; the precooked product was thereupon pregelatinized by drum drying for a period of about 30 minutes at a drum temperature of 300° F., and pulverized so as to obtain a product having a particle size range as set forth in Example I, hereinabove | 7.5 |
| Sugar | 25.0 |

The starch and sugar were blended and then admixed with the juice. The resulting mix was next heated to 190° F. for a period of five minutes and then canned and cooled. Sterilization by retorting was not required, in this instance, since sterilization had been accomplished by the combination of moderate cooking and the low pH level of the food system.

The resulting apple sauce exhibited an excellent grainy, pulpy texture resembling the natural fibrous fruit.

Dessert pudding

A dry blend of 10 parts of a high amylose corn starch, identical to that used in the apple sauce formulation described hereinabove, and 25 parts of sugar were admixed with 100 parts of whole milk. This mixture was heated to 190° F. for a period of five minutes. When cooled, the resulting pasty material provided an excellent grainy, pulpy textured pudding product.

Summarizing, it is seen that this invention provides for the preparation of food products characterized by a desirable grainy, pulpy texture. Variations may be made in proportions, procedures, and materials without departing from the scope of the invention which is defined by the following claims.

We claim:

1. A process for the preparation of a starch containing food product having a novel grainy, pulpy texture, said process comprising the steps of (1) admixing all of the individual, non-starch ingredients of said food product with water and an amylose-containing starch product, said starch product being first inhibited by reaction with a polyfunctional crosslinking agent so that it has a granule swelling power in the order of from about 3 to 8, the said inhibited starch product being then precooked at a temperature of from about 250 to 350° F. for a period of from about 0.5 to 5 minutes, said precooked inhibited starch being then pregelatinized by drum drying and reduced in pulverized form such that no more than about 25%, by weight, of its particles will be retained on a No. 12 mesh U.S. Standard Sieve and no more than about 60%, by weight, of its particles will pass through a No. 100 mesh U.S. Standard Sieve, the mixture thus prepared containing at least about 10%, by weight, of water; and, (2) thereupon heating the resulting mixture at a temperature of at least about 160° F. so as to effect the swelling of the starch particles therein.

2. The process of claim 1, wherein said polyfunctional crosslinking agent is selected from the group consisting of aliphatic dihalides, ether forming opoxy halogen compounds, cyanuric chloride, phosphorus oxychloride, metaphosphates, polymetaphosphate, formaldehyde containing resins and prepolymers, succinic anhydride, mixtures of adipic acid and acetic anhydride, and mixtures of citric acid and acetic anhydride.

3. The process of claim 1, in which the heated mixture resulting from step (2) is rendered sterile by subjecting the same to a temperature of at least about 212° F. and a pressure of at least one atmosphere.

4. The process of claim 1, in which the said resulting mixture has a maximum pH at a level of 4.5 and is heated to a temperature of at least about 160° F. so as to effect the swelling of the starch particles therein and the sterilization thereof.

5. The process of claim 4, wherein said polyfunctional crosslinking agent is selected from the group consisting of aliphatic dihalides, ether forming epoxy halogen compounds, cyanuric chloride, phosphorus oxychloride, metaphosphates, polymetaphosphates, formaldehyde, formaldehyde containing resins and prepolymers, succinic anhydride, mixtures of adipic acid and acetic anhydride, and mixtures of citric acid and acetic anhydride.

References Cited

UNITED STATES PATENTS

| | | | |
|---|---|---|---|
| 2,500,950 | 3/1950 | Konigsberg | 260—233.3 |
| 2,733,238 | 1/1956 | Kerr | 99—139 |
| 3,443,964 | 5/1969 | Marolta et al. | 99—139 |

RAYMOND N. JONES, Primary Examiner

J. M. HUNTER, Assistant Examiner

U.S. Cl. X.R.

99—28, 92, 101, 124, 134, 139, 144